(12) United States Patent
Tsubouchi

(10) Patent No.: US 8,925,906 B2
(45) Date of Patent: Jan. 6, 2015

(54) DEVICE FOR DILUTING A VISCOUS SUBSTANCE

(75) Inventor: Osamu Tsubouchi, Chiryu (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 233 days.

(21) Appl. No.: 13/697,959

(22) PCT Filed: May 18, 2011

(86) PCT No.: PCT/JP2011/002769
§ 371 (c)(1),
(2), (4) Date: Nov. 14, 2012

(87) PCT Pub. No.: WO2011/158432
PCT Pub. Date: Dec. 22, 2011

(65) Prior Publication Data
US 2013/0062794 A1    Mar. 14, 2013

(30) Foreign Application Priority Data

Jun. 17, 2010    (JP) ................. 2010-138603

(51) Int. Cl.
*B01F 3/04*    (2006.01)
*F25B 37/00*    (2006.01)

(52) U.S. Cl.
CPC . *F25B 37/00* (2013.01); *Y02B 30/62* (2013.01)
USPC ......................................... 261/97; 261/119.1

(58) Field of Classification Search
USPC ........ 261/95, 97, 119.1, 140.1, 140.2; 96/228
See application file for complete search history.

(56) References Cited

U.S. PATENT DOCUMENTS 3,479,801 A * 11/1969 Yamasaki ...................... 96/229

FOREIGN PATENT DOCUMENTS

| JP | 4-236079 A | 8/1992 |
| JP | 6-50634 A | 2/1994 |
| JP | 8-82456 A | 3/1996 |
| JP | 2000-179989 A | 6/2000 |
| JP | 2000-283662 A | 10/2000 |

OTHER PUBLICATIONS

International Search Report (PCT/ISA/210) issued on Aug. 16, 2011, by the Japanese Patent Office as the International Searching Authority for International Application No. PCT/JP2011/002769.
Written Opinion (PCT/ISA/237) issued on Aug. 16, 2011, by the Japanese Patent Office as the International Searching Authority for International Application No. PCT/JP2011/002769.

* cited by examiner

*Primary Examiner* — Robert A Hopkins
(74) *Attorney, Agent, or Firm* — Buchanan Ingersoll & Rooney PC

(57) ABSTRACT

Provided is a device for diluting a viscous substance which is advantageous in spreading a viscous substance to increase its area and allow efficient dilution of the viscous substance with a diluent. The device comprises a base body having a treatment chamber to be supplied with a viscous substance and a diluent for diluting the viscous substance; a surface element having a coating surface to be attached by the viscous substance supplied to the treatment chamber of the base body; and a movable member movable along the coating surface of the surface element and a coating element. The coating element is provided on the movable member and mechanically spreads the viscous substance attached to the coating surface of the surface element on the coating surface of the surface element in association with movement of the movable member to increase area of the viscous substance.

7 Claims, 9 Drawing Sheets

DEVICE FOR DILUTING A VISCOUS SUBSTANCE

TECHNICAL FIELD

The present invention relates to a device for diluting a viscous substance, which dilutes a viscous substance having viscosity with a diluent. The device for diluting a viscous substance can be applied, for example, to an absorber of an absorption heat pump device (an absorption refrigerator).

BACKGROUND ART

Patent Literature No. 1 discloses a technique of spraying a viscous absorbing liquid which has been reserved in a tray disposed above heat transfer pipes from the tray toward the heat transfer pipes by gravity, thereby placing the absorbing liquid on the heat transfer pipes and cooling the absorbing liquid on the heat transfer pipes, and contacting the absorbing liquid and vapor, thereby allowing the absorbing liquid to absorb the vapor, in a liquid spray device of an absorption water cooler-heater. Patent Literature No. 2 discloses a technique of uniformly diffusing and mixing liquid to be dropped on coating surfaces of heat transfer surfaces by a blade or a brush, thereby increasing effective heat transfer area of the liquid, in an absorber of an absorption refrigerator.

Patent Literature No. 1: Japanese Unexamined Patent Publication No. 2000-179989

Patent Literature No. 2: Japanese Unexamined Patent Publication No. H4-236079

DISCLOSURE OF INVENTION

Problems to be Solved by Invention

In Patent Literature No. 1, the absorbing liquid is dropped from above onto the heat transfer pipes of the cooler. Due to its high surface tension, the absorbing liquid has a high viscosity and a poor wettability. Therefore, it is difficult to widely disperse the absorbing liquid on coating surfaces of the heat transfer pipes of the cooler. Therefore, there is a limit in increasing contact area of the absorbing liquid and water vapor, and there is a limit in diluting the absorbing liquid. Also in Patent Literature No. 2, there is a limit in increasing contact area of the absorbing liquid and water vapor and there is a limit in diluting the absorbing liquid with the water vapor.

The present invention has been made in view of the above-mentioned actual circumstances. It is an object of the present invention to provide a device for diluting a viscous substance which is advantageous in spreading the viscous substance to increase its area and allow efficient dilution of the viscous substance with a diluent.

Means for Solving the Problems (1) A device for diluting a viscous substance according to a first aspect of the present invention comprises (i) a base body having a treatment chamber to be supplied with a viscous substance and a diluent for diluting the viscous substance; (ii) a surface element disposed in the treatment chamber of the base body and having a coating surface to be attached by the viscous substance supplied to the treatment chamber of the base body; and (iii) a coating element having a movable member disposed in the treatment chamber of the base body and being movable along the coating surface of the surface element, and a coating portion disposed on the movable member and mechanically spreading the viscous substance attached to the coating surface of the surface element on the coating surface of the surface element in association of the movable member to increase area of the viscous substance.

The movable member moves along the coating surface of the coating element while keeping the viscous substance attached to the coating surface of the surface element. In association with movement of the movable member, the coating portion moves along the coating surface of the surface element. Therefore, the viscous substance placed on the coating surface of the surface element is mechanically spread on the coating surface of the surface element and increased in area. Therefore, contact area of the viscous substance and the diluent increases. Accordingly, the viscous substance efficiently absorbs the diluent and gets diluted.

(2) According to a device for diluting a viscous substance according to a second aspect of the present invention, in the abovementioned aspect, a scooping element for scooping the viscous substance reserved in a bottom portion of the treatment chamber and dropping the scooped viscous substance onto the coating surface of the surface element is disposed in the treatment chamber of the base body. Thus, the scooping element for scooping the viscous substance reserved in the bottom portion of the treatment chamber and dropping the scooped viscous substance onto the coating surface of the surface element is disposed in the treatment chamber of the base body. The scooping element scoops the viscous substance reserved in the bottom portion of the treatment chamber and drops the scooped viscous substance onto the coating surface of the surface element. Thereby the viscous substance can be spread on the coating surface of the surface element and increased in area, and as a result the viscous substance can be efficiently diluted with the diluent in the treatment chamber. The scooping element can be of a type that is connected to the coating element and moves integrally with the coating element, or can be of a type that is driven by a different driving source from that of the coating element and driven independently of the coating element.

(3) According to a device for diluting a viscous substance according to a third aspect of the present invention, in the above aspects, the scooping element comprises one or more containers which are capable of being immersed in the viscous substance reserved in the bottom portion of the treatment chamber and capable of rising above the viscous substance reserved in the bottom portion of the treatment chamber, so that the viscous substance reserved in the bottom portion of the treatment chamber is scooped by the immersion and rise of the one or more containers and dropped onto the coating surface of the surface element. The viscous substance reserved in the bottom portion of the treatment chamber is scooped in the one or more containers by the immersion and rise of the one or more containers. The viscous substance scooped in the one or more containers is dropped on the coating surface of the surface element.

(4) According to a device for diluting a viscous substance according to a fourth aspect of the present invention, in the above aspects, the container has a guide portion for enhancing attachability of the viscous substance to the coating surface by guiding the viscous substance scooped in the container toward the coating surface of the surface element. The viscous substance scooped in the container is guided toward the coating surface of the surface element by the guide portion. This enhances attachability of the viscous substance to the coating surface.

(5) According to a device for diluting a viscous substance according to a fifth aspect of the present invention, in the above aspects, at least one of the guide portion and the container comprises the coating portion. The viscous substance is scooped by the container and coated on the coating surface of the surface element by the coating portion by way of the guide portion. When the coating portion is provided on the guide portion, the viscous substance in the container can be more effectively transferred from the guide portion to the coating portion, when compared to a case where the coating portion is provided at a distance from the guide portion. This provides an advantage in which the amount of viscous substance which drops down without transferred to the coating portion can be decreased. On the other hand, when the coating portion is provided on the container, the viscous substance immediately after discharged from the container can be effectively coated on the coating surface of the surface element by the coating portion provided on the container.

(6) According to a device for diluting a viscous substance according to a sixth aspect of the present invention, in the above aspects, the container of the scooping element is held by the movable member of the coating element in a manner to move in association with the coating portion of the coating element, and the scooping element and the coating element are driven by a common driving source. Since the scooping element and the coating element are driven by a common driving source, the number of driving sources is decreased. This is advantageous in reducing the number of component parts and the size of the dilution device.

(7) According to a device for diluting a viscous substance according to a seventh aspect of the present invention, in the above aspects, the surface element can be cooled. This is advantageous in a case where performance of diluting the viscous substance with the diluent is enhanced when the viscous substance is cooled.

(8) According to a device for diluting a viscous substance according to an eighth aspect of the present invention, in the above aspects, the base body is a base body of an absorber or a base body of an evaporator of an absorption refrigerator.

Advantageous Effects of Invention

According to the present invention, when the movable member moves along the coating surface of the surface element, the viscous substance is spread on the coating surface of the surface element and increased in area. Since the viscous substance is thus mechanically increased in area on the coating surface of the surface element, contact area of the viscous substance and the diluent increases. Therefore, the viscous substance is efficiently diluted with the diluent in the treatment chamber.

DESCRIPTION OF REFERENCE NUMERALS

Figure 1:
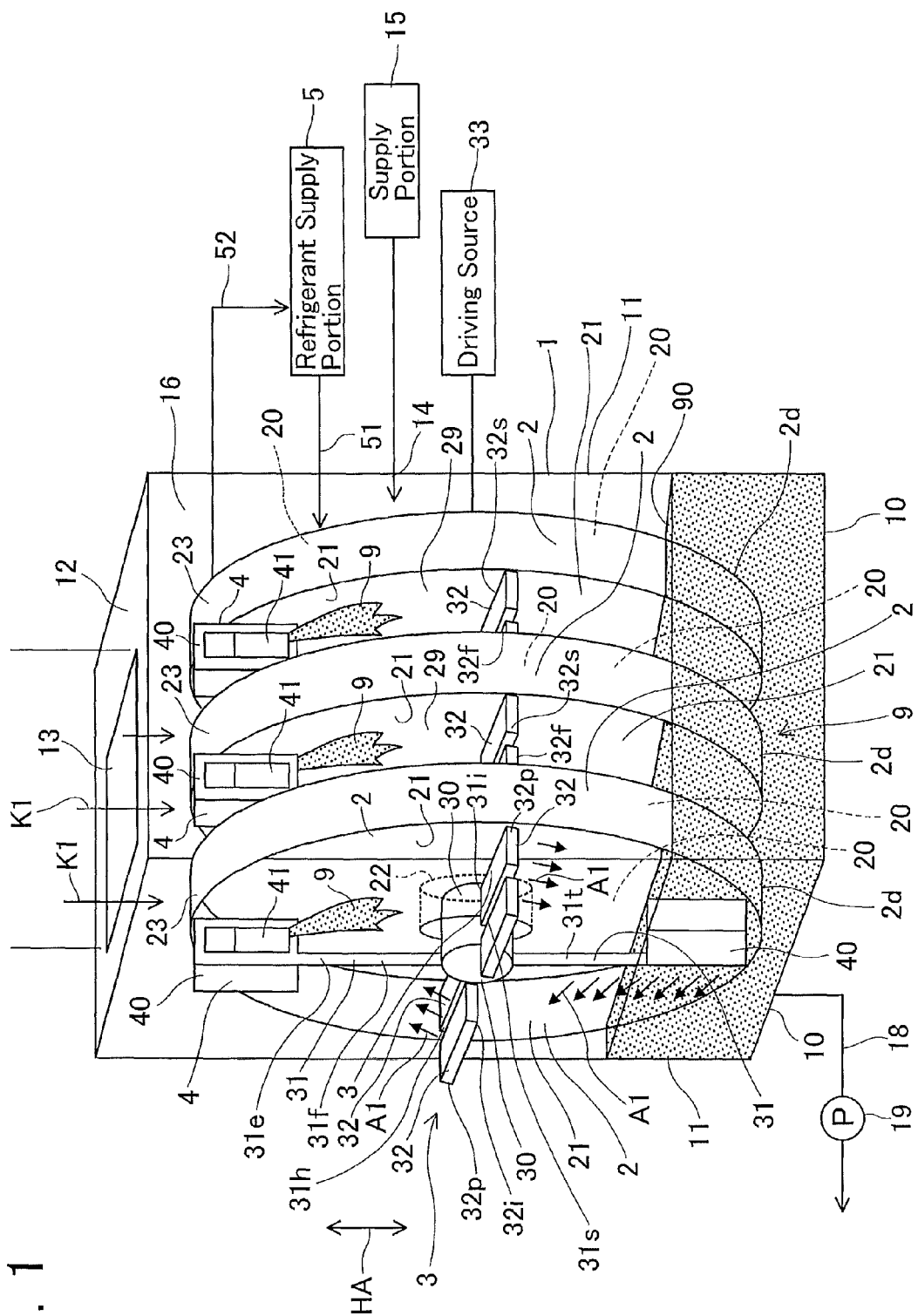
FIG. 1 is a perspective view showing a concept of a device for diluting a viscous substance according to first embodiment.

1: a base body, 10: a bottom portion, 16: a treatment chamber, 2: a cooler (a surface element), 20: a cooling chamber, 21: a coating surface, 3: a coating element, 30: a driving shaft, 31: an arm portion (a movable member), 32: a coating portion, 33: a driving source, 4: a scooping element, 40: a container, 41: a scoop opening, 43: a guide portion, 5: a refrigerant supply portion, 53: a cooling source, 9: a viscous substance, 9W: water

BEST MODE FOR CARRYING OUT THE INVENTION

A viscous substance is a fluid substance having a certain viscosity. Examples of such a viscous substance include compounds of a halogen element and lithium such as lithium bromide and lithium iodide. A diluent is an agent for diluting the viscous substance and examples include water vapor, liquid phase water, alcohol, and an organic solvent. A base body can be anything as long as it has a treatment chamber to be supplied with the viscous substance and a diluent for diluting the viscous substance. A surface element can be anything as long as it is disposed in the treatment chamber of the base body and has a coating surface to be attached by the viscous substance supplied to the treatment chamber of the base body. A movable member can be anything as long as it is disposed in the treatment chamber of the base body and can be moved along the coating surface of the surface element. A coating element can be anything as long as it is disposed on the movable member and mechanically spreads the viscous substance attached to the coating surface of the surface element on the coating surface of the surface element in association with movement of the movable member to increase area of the viscous substance. It is preferable to provide a driving source for driving the movable member. Examples of the driving source include an electric motor and a hydraulic motor.

It is preferred that a container of a scooping element is held by the movable member of the coating member in a manner to move in association with the coating portion of the coating element. In this case, since the scooping element and the coating element are driven by a common driving source, the number of driving sources and the size of the dilution device can be reduced. Moreover, immediately after the viscous substance is dropped onto the coating surface of the surface element by the scooping element, the viscous substance lying on the coating surface can be widely spread by the coating element. It is preferred that the scooping element comprises one or more containers which are capable of being immersed in the viscous substance reserved in the bottom portion of the treatment chamber and capable of rising above the viscous substance reserved in the bottom portion of the treatment chamber. In this case, the viscous substance reserved in the bottom portion of the treatment chamber can be scooped by the immersion and rise of the one or more containers and dropped onto the coating surface of the surface element. It is preferred that the container is held by the movable member of the coating element. In this case, in association with movement of the movable member of the coating element, the container can move together with the movable member and the viscous substance can be scooped by the immersion and rise of the container and dropped onto the coating surface of the surface element. It is preferred that the container has a guide portion for enhancing attachability of the viscous substance to the coating surface of the surface element by guiding the viscous substance scooped in the container toward the coating surface. In this case, since attachability of the viscous substance to the coating surface can be enhanced, the viscous substance can be efficiently spread on the coating surface of the surface element by the coating element. Shape of the container is not particularly limited.

When the viscous substance is diluted with a diluent, dilution efficiency of the viscous substance sometimes decreases at high temperature. In this case, it is preferred that the surface element can be cooled. This suppresses a decrease in viscous substance dilution efficiency. It is preferred that the coating portion of the coating element spreads the viscous substance on the coating surface of the surface element and increases its area by moving along the coating surface of the surface element while contacting the coating surface of the cooling element. The viscous substance can be spread in a film shape on the coating surface of the surface element and increased in area. It is preferred that the surface element spreads the viscous substance on the coating surface of the surface element and increases its area by moving along the coating surface of the surface element without contacting the coating surface of the cooling element. Since the viscous substance is thus increased in area, contact area of the viscous substance and the diluent increases. Since the coating element does not contact the coating surface of the cooling element, friction heat is decreased and damage and abrasion of the coating element and the surface element caused by friction is suppressed. In this case, abrasion powder is suppressed from being mixed in the viscous substance.

First Embodiment

Figure 2:
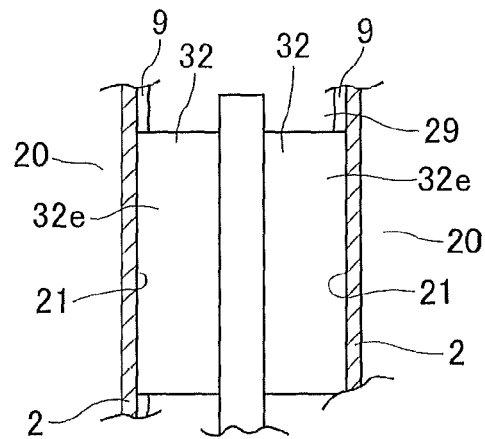
FIG. 2 is a schematic view showing that coating portions contact coating surfaces of coolers according to first embodiment.
Figure 3:
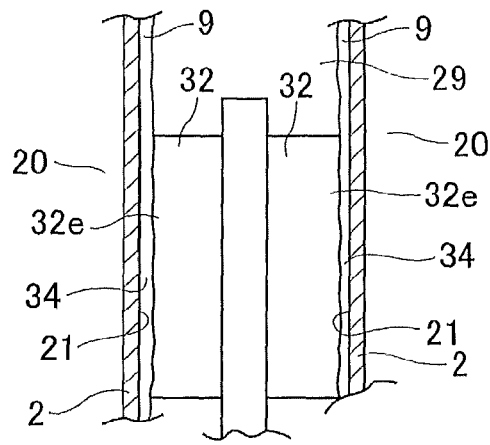
FIG. 3 is a schematic view showing that coating portions are close to but not in contact with coating surfaces of coolers according to first embodiment.

FIG. 1 to FIG. 3 shows a concept of first embodiment. A device for diluting a viscous substance according to the present embodiment has a base body 1, coolers 2 serving as surface elements, and a coating element 3, as shown in FIG. 1. The base body 1 has the shape of a box having a treatment chamber 16, and comprises a bottom portion 10 for reserving a viscous substance 9, a side portion 11, a ceiling portion 12, a first opening 13 serving as a viscous substance supply portion which allows the viscous substance 9 to be supplied in the direction of the arrow K1 toward the treatment chamber 16 by use of gravity, and a second opening 14 serving as a diluent supply port which allows a diluent (e.g., water vapor, liquid phase water, alcohol, and a solvent) for diluting the viscous substance 9 from a supply portion 15 to the treatment chamber 16. Accordingly, the diluent (e.g., water vapor, liquid phase water, alcohol, and a solvent) is supplied to the treatment chamber 16.

The treatment chamber 16 can have the air atmosphere, a reduced-pressure atmosphere or a vacuum atmosphere in accordance with purposes for using the present device and so on. Each of the coolers 2 has the shape of a drum having a horizontally-extending shaft hole 22 at its center region. Each of the coolers 2 has a cooling function for cooling the viscous substance 9 lying on a coating surface 21 and has a cooling chamber 20 to be supplied with a refrigerant. The plurality of coolers 2 are fixed in the treatment chamber 16 so as to be in parallel with each other, and thus heat exchange capability (cooling capability) is secured. Each of the coolers 2 has circular coating surfaces 21 and an annular outer circumferential surface 23. The coating surfaces 21 are flat and extend along a vertical direction and a horizontal direction. A lower portion 2d of each of the coolers 2 is immersed in the flowable viscous substance 9 reserved in the bottom portion 10 of the treatment chamber 16 of the base body 1 and thereby contacts the viscous substance 9 reserved in the bottom portion 10. Therefore, when a refrigerant is supplied to the cooling chambers 20 of the coolers 2, the refrigerant can be expected to exhibit a cooling function to cool the viscous substance 9 reversed in the bottom portion 10 of the base body 1 through the lower portions 2d. It should be noted that performance of diluting the viscous substance 9 with the diluent is enhanced when the viscous substance 9 is cooled.

Furthermore, as shown in FIG. 1, the dilution device comprises a coating element 3 for forcibly spreading the viscous substance 9 which lies on the coating surfaces 21 of the coolers 2 in a film shape. The coating element 3 has a driving shaft 30 capable of rotating about its axis, a plurality of arm portions 31 connected to the driving shaft 30 and serving as movable members which extend in outward radial directions (radiation directions), and coating portions 32 provided on the arm portions 31. The coating portions 32 are provided in a manner to extend in radial directions (radiation directions) of the coolers 2 along the coating surfaces 21 of the coolers 2. That is to say, the coating portions 32 extend from an inner end 32i to an outer end 32p of each of the coolers 2. As can be understood from FIG. 1, the coating portions 32 are disposed in a gap 29 between two adjacent and facing coolers 2, 2. Accordingly, the coating portions 32 are provided with first coating portions 32f for coating the coating surface 21 of one cooler 2 of two adjacent coolers 2 and second coating portions 32s for coating the coating surface 21 of the other cooler 2.

The driving shaft 30 is disposed in a manner to be inserted through the axial holes 22 of the coolers 2, is of a horizontal axis type having an axis extending along a horizontal direction, and is connected to a driving source 33. The driving source 33 can be constituted by an electric motor or a hydraulic motor. The coating portions 32 are members for spreading the viscous substance 9 widely and can have a brush shape, a mop shape, a blade shape, etc. The driving shaft 30 is connected to the driving source 33, such as a motor, disposed outside of the base body 1. When the driving source 33 is driven, the driving shaft 30 rotates about its axis and the coating portions 32 make rotational movements around the driving shaft 30 along the flat coating surfaces 21 of the coolers 2. Thus, the coating portions 32 of the coating element 3 move along the coating surfaces 21 of the coolers 2. This allows the viscous substance 9 lying on the coating surfaces 21 of the coolers 2 to be mechanically spread on the coating surfaces 21 of the coolers 2 and increased in area. Since the viscous substance 9 is thus increased in area on the coating surfaces 21 of the coolers 2, contact area of the viscous substance 9 and the diluent can be increased. When the driving shaft 30 thus rotates about its axis, the coating portions 32 move in a height direction of the treatment chamber 16 (the HA direction) along the coating surfaces 21 of the coolers 2 together with the arm portions 31. As a result, the coating portions 32 can forcibly spread the viscous substance 9 lying on the coating surfaces 21 of the coolers 2 further on the coating surfaces 21 so as to cause the viscous substance 9 to have a film shape and be increased in area. In this case, since the coating surfaces 21 are flat, there is a merit that the viscous substance 9 is easy to be forcibly spread on the coating surfaces 21.

Each scooping element 4 has a container 40 for scooping the viscous substance 9 reserved in the bottom portion 10 in a hollow chamber thereof and dropping the scooped viscous substance 9 onto the coating surfaces 21 of the coolers 2. The container 40 is held by an arm portion 31 (a movable member) of the coating element 3, and has a dipper shape or a cup shape, and has a scoop opening 41. Shape of the container 40 is not particularly limited to the aforementioned shapes, and basically it is only necessary to have a structure which can reserve and discharge the viscous substance 9. Since the container 40 is attached to the arm portion 31, when the driving source 33 is driven, the driving shaft 30 makes rotational movements along the direction of the arrow A1 (the scooping direction) in a height direction (the HA direction) together with the coating portions 32 and the containers 40. The outer end 32$p$ of each of the coating portions 32 rotates along outer peripheries of outer circumferential surfaces 23 of the coolers 2. Thus, the coating portions 32 of the coating element 3 and the containers 40 of the scooping elements 4 use the driving source 33 as a common driving source and move in association with each other. Therefore, the number of component parts and the size of the dilution device can be reduced.

It is preferred that the openings 41 of the containers 40 are respectively directed toward the coating surfaces 21 of the coolers 2, though not shown in FIG. 1, so that the viscous substance 9 discharged from the openings 41 of the containers 40 can efficiently drop onto the coating surfaces 21 of the coolers 2. Since each one of the containers 40 is provided on an outer radial end portion 31$e$ of an arm portion 31, the container 40 has a large rotation radius. This is advantageous in dropping the viscous substance 9 in the containers 40 onto the entire coating surfaces 21 of the coolers 2, which have a cooling function, and the cooling function of the coolers 2 can be effectively used. However, each one of the containers 40 can be provided not on the outer radial end portion 31$e$ but on a middle portion of the arm portion 31.

According to the present embodiment, when the plurality of arm portions 31 are referred to as a first arm portion 31$f$, a second arm portion 31$s$, a third arm portion 31$t$, and a fourth arm portion 31$h$ in a rotational direction, as can understood from FIG. 1, a container 40 is fixed to the first arm portion 31$f$, a coating portion 32 is fixed to the second arm portion 31$s$, a container 40 is fixed to the third arm portion 31$t$ and a coating portion 32 is fixed to the fourth arm portion 31$h$. The containers 40 and the coating portions 32 are thus provided alternately on the plurality of arm portions 31 in their rotational direction. This can provide an advantage that the viscous substance 9 immediately after dropped onto the coating surfaces 21 of the coolers 2 from the containers 40 can be immediately coated and mechanically widely spread by the coating portions 32. This can contribute to dilution of the viscous substance 9 lying on the coating surfaces 21 with the diluent.

As can be understood from FIG. 1, of the plurality of arm portions 31, the arm portions 31 where the containers 40 are provided are not provided with the coating portions 32. Of the plurality of arm portions 31, the arm portions 31 where the coating portions 32 are provided are not provided with the containers 40. However, the present invention is not limited to this configuration, and both a coating portion 32 and a container 40 can be attached to one arm portion 31.

It is preferred that bearings are provided between an outer wall surface of the driving shaft 30 and inner wall surfaces of the axial holes 22 in order to make rotation of the driving shaft 30 smooth. When the driving shaft 30 rotates about its axis, the containers 40 are immersed in and scoop the viscous substance 9 reserved in the bottom portion 10 of the treatment chamber 16 and then rise above a liquid level 90 of the viscous substance 9 reserved in the bottom portion 10 of the treatment chamber 16 into space in the treatment chamber 16. When the driving shaft 30 thus rotates about its axis, the viscous substance 9 in the containers 40 is dropped onto the coating surfaces 21 of the coolers 2. Since the driving shaft 30 continuously rotates, the viscous substance 9 in the containers 40 is repeatedly dropped onto the coating surfaces 21 of the coolers 2. As a result, the viscous substance 9 attached to the coating surfaces 21 of the coolers 2 can be spread on the coating surfaces 21 of the coolers 2 by the coating portions 32 of the coating element 3 and increased in area while being allowed to flow down by gravity.

According to the thus-constructed present embodiment, even when the viscous substance 9 has a great surface tension and a high viscosity, since the viscous substance 9 is increased in area on the coating surfaces 21 of the coolers 2, contact area of the viscous substance 9 and the diluent dramatically increases in the treatment chamber 16. Since the contact area of the viscous substance 9 and the diluent thus increases in the treatment chamber 16, the viscous substance 9 is efficiently diluted with the diluent in the treatment chamber 16 so as to have a lower concentration. This can provide an advantage that frequency of adding a surfactant to the viscous substance 9 can be decreased and maintenance intervals can be increased.

When the viscous substance 9 is diluted with the diluent as mentioned above, there is a risk that the viscous substance 9 generates heat and dilution efficiency lowers. In this respect, according to the present embodiment, each one of the coolers 2 has a cooling chamber 20 for cooling the cooler 2. The refrigerant is supplied from the refrigerant supply portion 5 through a supply passage 51 to the cooling chambers 20, and the refrigerant in the cooling chambers 20 is returned through an exhaust passage 52 to the refrigerant supply portion 5. The refrigerant returned to the refrigerant supply portion 5 is cooled by the refrigerant supply portion 5, and then supplied again from the refrigerant supply portion 5 through the supply passage 51 to the cooling chamber 20. The coolers 2 are thus cooled and the viscous substance 9 is suppressed from overheating. The refrigerant can be anything as long as it has a cooling function, and examples include a cooling liquid such as cooling water, a cooling gas, and a mist. Therefore, while the coolers 2 are cooled by the refrigerant from inside, the viscous substance 9 is increased in area on the coating surfaces 21 of the coolers 2. Therefore, the viscous substance 9 can be efficiently diluted with the diluent. It should be noted that a connecting passage 18 which connects the treatment chamber 16 and a subsequent step is provided at the bottom portion 10 of the treatment chamber 16. It is preferred that a pump 19 (a delivery source) is provided in the connecting passage 18. The pump 19 is driven, when needed, to transfer the viscous substance 9 reserved in the bottom portion 10 of the treatment chamber 16 to the subsequent step through the connecting passage 18.

In some atmosphere of the treatment chamber 16, there is a possibility that the viscous substance 9 lying on the coating surfaces 21 of the coolers 2 adsorb gas molecules (e.g., nitrogen molecules and oxygen molecules). In this case, there is a risk that contact area of the viscous substance 9 and the diluent (e.g., water vapor) is reduced and it affects dilution efficiency of the viscous substance 9. Even in this case, however, the coating portions 32 can mechanically contact the viscous substance 9 lying on the coating surfaces 21 of the coolers 2. Therefore, newly formed surfaces of the viscous substance 9 are readily exposed on the coating surfaces 21 of the coolers 2. Therefore, contact area of the viscous substance 9 and the diluent (e.g., water vapor) can be well secured, and dilution efficiency of the viscous substance 9 is secured.

According to the present embodiment, since the coating surfaces 21 of the coolers 2 extend along a height direction (the HA direction), it can be expected that the viscous substance 9 lying on the coating surfaces 21 is widely spread by use of gravity. In this case, even if the viscous substance 9 has a high viscosity, the viscous substance 9 absorbs a large amount of diluent (e.g., water vapor) and is diluted with the diluent, so the viscosity of the viscous substance 9 greatly decreases. Therefore, the viscous substance 9 which has been diluted and decreased in viscosity on the coating surfaces 21 of the coolers 2 can be rapidly flown down along the coating surfaces 21 by use of gravity.

As shown in FIG. 2, fore end portions 32e of the coating portions 32 can contact the coating surfaces 21 of the coolers 2. In this case, although friction occurs between the fore end portions 32e of the coating portions 32 and the coating surfaces 21 of the coolers 2, the viscous substance 9 lying on the coating surfaces 21 of the coolers 2 can be efficiently spread in a film shape. Alternatively, as shown in FIG. 3, fore end portions 32e of the coating portions 32 can be located in the vicinity of the coating surfaces 21 of the coolers 2 with micro gap 34 therebetween and do not contact the coating surfaces 21 of the coolers 2. In this case, since friction is avoided between the coating portions 32 and the coating surfaces 21 of the coolers 2, damage of the coating surfaces 21 of the coolers 2 and/or the coating portions 32 caused by friction can be suppressed. Moreover, a decrease in the abovementioned friction allows smooth rotation of the coating element 3 and the containers 40 and a decrease in output driving force of the driving source 33, and accordingly contributes to size reduction of the driving source 33. It should be noted that the present embodiment can be applied to a device for diluting a viscous substance, for example, an absorber of an absorption heat pump device. In this case, the viscous substance 9 is lithium bromide, lithium iodide, or the like, and the diluent is water vapor.

Second Embodiment

Figure 4:
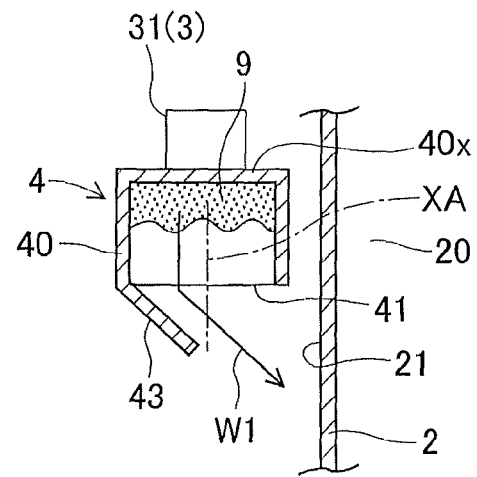
FIG. 4 is a schematic view showing that a viscous substance is dropped onto a coating surface of a cooler by a guiding portion formed on a container according to second embodiment.

FIG. 4 shows second embodiment. Since the present embodiment has basically the same construction, operation and advantages as those of the abovementioned respective embodiments, FIG. 1 to FIG. 3 can be used with necessary modifications. As shown in FIG. 4, however, when the viscous substance 9 in a container 40 constituting a scooping element 4 is dropped onto a coating surface 21 of a cooler 2, a guide portion 43 is provided for guiding the viscous substance 9 in the container 40 toward the coating surface 21 of the cooler 2. The guide portion 43 is provided on the container 40. As shown in FIG. 4, the guide portion 43 can be inclined with respect to the container 40 in a manner to be closer to the coating surface 21 of the cooler 2 as the guide portion 43 is more distant from a bottom 40x of the container 40 along a normal line XA of the scoop opening 41 of the container 40. In this case, when the viscous substance 9 in the container 40 is removed from the container 40, the viscous substance 9 can be guided in the direction of the arrow W1 along the guide portion 43 toward the coating surface 21 of the cooler 2. This can provide an advantage that, when the container 40 is at some distance from the coating surface 21 of the cooler 2, the viscous substance 9 in the container 40 is easily attached to the coating surface 21 of the cooler 2. It should be noted that this embodiment can be applied, for example, to an absorber of an absorption heat pump device. In this case, the viscous substance 9 is lithium bromide, lithium iodide, or the like, and the diluent is water vapor.

Third Embodiment

Figure 5:
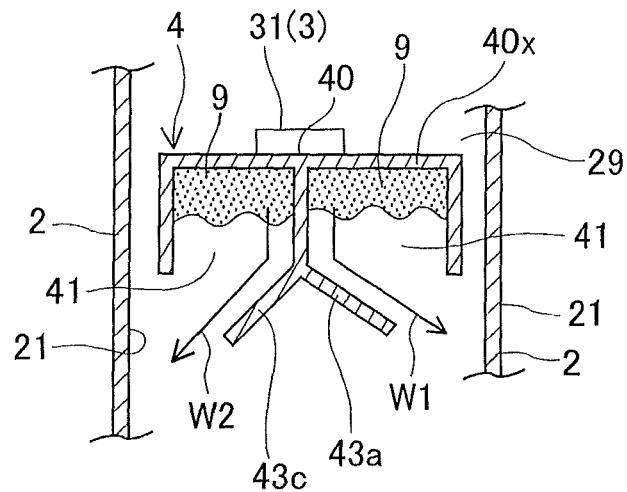
FIG. 5 is a schematic view showing that a viscous substance is dropped onto coating surfaces of coolers by guide portions formed on a container according to third embodiment.

FIG. 5 shows third embodiment. The present embodiment has basically the same construction, operation and advantages as those of the abovementioned respective embodiments. As shown in FIG. 5, however, when the viscous substance 9 in a container 40 constituting a scooping element 4 is dropped onto coating surfaces 21 of coolers 2, the container 40 is provided with guide portions 43a, 43c for guiding the viscous substance 9 in the container 40 toward the coating surfaces 21 of the coolers 2. The guide portions 43a, 43c are directed in opposite directions to each other and can respectively guide the viscous substance 9 in opposite directions (the W1 direction and the W2 direction). In this case, it is preferred that, as shown in FIG. 5, the container 40 is disposed in a gap 29 between coating surfaces 21 of two adjacent coolers 2 which face each other with the gap 29 therebetween. It should be noted that the present embodiment can be applied, for example, to an absorber of an absorption heat pump device. In this case, the viscous substance 9 is lithium bromide, lithium iodide, or the like, and the diluent is water vapor.

Fourth Embodiment

Figure 6:
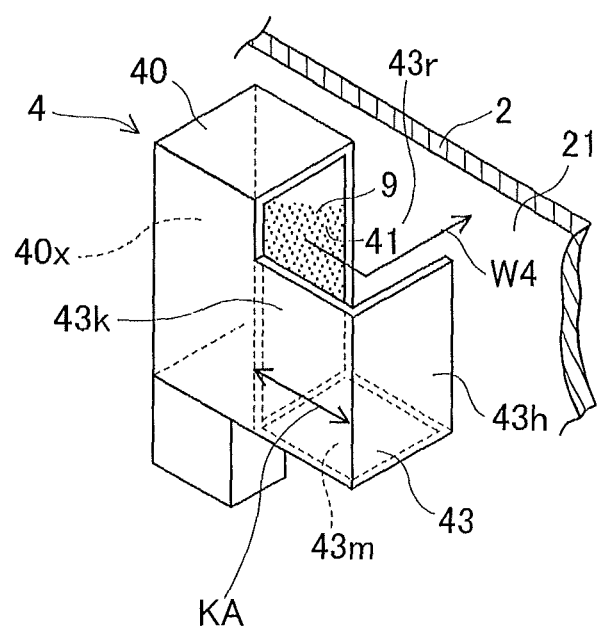
FIG. 6 is a schematic view showing that a viscous substance is dropped onto a coating surface of a cooler by a guide portion formed on a container according to fourth embodiment.

FIG. 6 shows fourth embodiment. The present embodiment has basically the same construction, operation and advantages as those of first embodiment. As shown in FIG. 6, when the viscous substance 9 in a container 40 constituting a scooping element 4 is dropped onto a coating surface 21 of a cooler 2, the container 40 is provided with a guide portion 43 for guiding the viscous substance 9 in the container 40 toward the coating surface 21 of the cooler 2. The guide portion 43 has a collision wall 43h which faces a bottom 40x and an opening 41 of the container 40, a connecting wall 43k which extends along the coating surface 21 of the cooler 2, a connecting wall 43m, and a guide opening 43r which faces the coating surface 21 of the cooler 2 while placed in the vicinity of the coating surface 21 of the cooler 2. As shown in FIG. 6, when the container 40 is located near or at a top dead center of a turning track, the collision wall 43h guides the viscous substance 9 discharged from the opening 41 of the container 40 in the direction of the arrow W4 toward the coating surface 21 of the cooler 2 while causing the viscous substance 9 to collide against itself. As shown in FIG. 6, when the container 40 is located at the top dead center of the turning track, the connecting wall 43m of the container 40 serves as a bottom wall which closes a downside, and suppresses the viscous substance 9 discharged from the container 40 from dropping straight down by gravity. When the container 40 is located at a bottom dead center of the turning track and immersed in the viscous substance 9 reserved in the bottom portion 10 of the treatment chamber 16, a size KA of the connecting wall 43k forms a guide opening 43r of the container 40. When the container 40 is immersed in the viscous substance 9 reserved in the bottom portion 10 of the treatment chamber 16, the guide opening 43r serves as a function to allowing the viscous substance 9 reserved in the bottom portion 10 of the treatment chamber 16 to flow into the container 40. It should be noted that the present embodiment can be applied, for example, to an absorber of an absorption heat pump device. In this case, the viscous substance 9 is lithium bromide, lithium iodide, or the like, and the diluent is water vapor.

Fifth Embodiment

Figure 7:
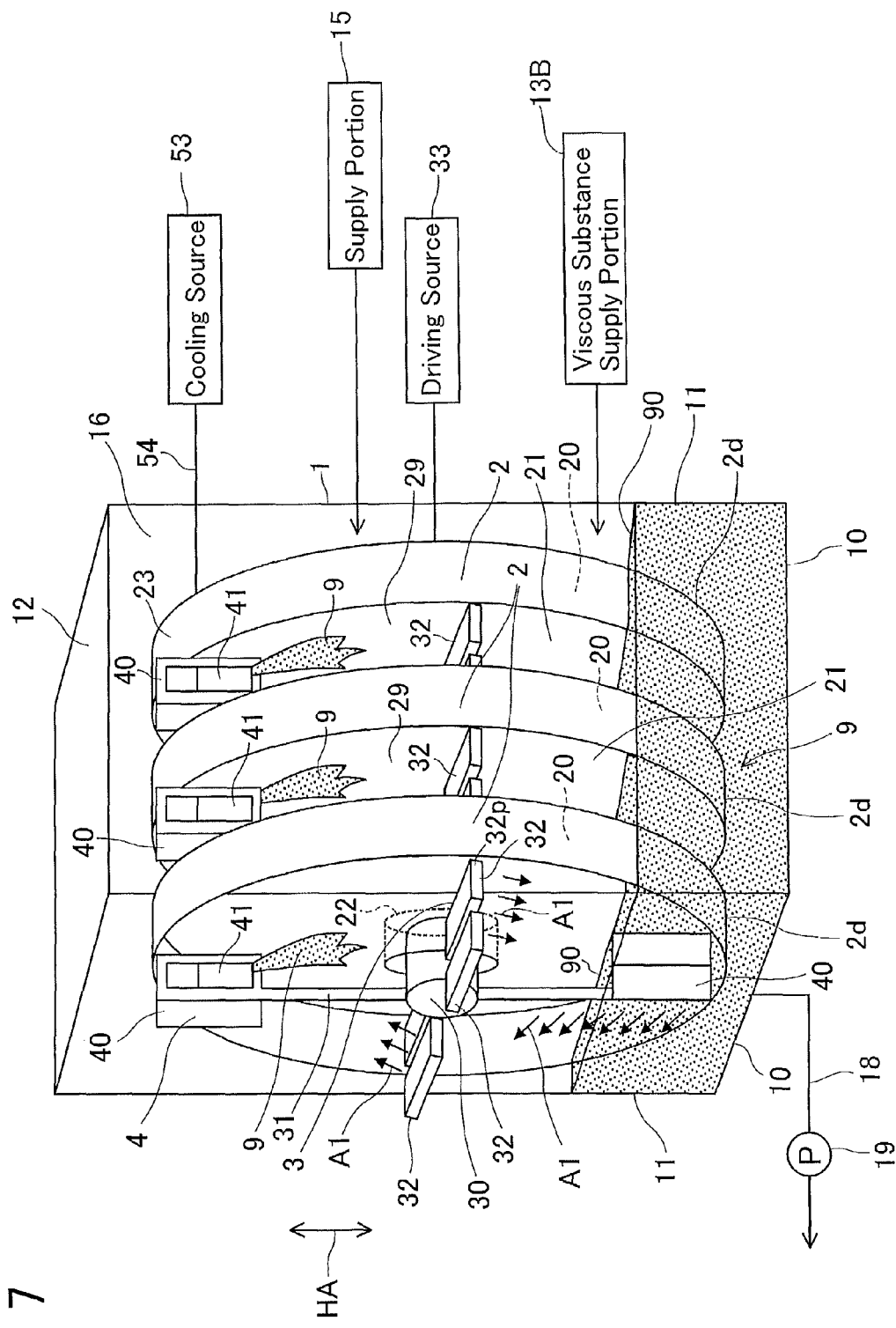
FIG. 7 is a perspective view showing a concept of a device for diluting a viscous substance according to fifth embodiment.

FIG. 7 shows fifth embodiment. The present embodiment has basically the same construction, operation and advantages as those of first embodiment. However, a viscous substance supply portion 13B which supplies the flowable viscous substance 9 from the supply portion 15 to the treatment chamber 16 is provided in the vicinity of the bottom portion 10. The coolers 2 are heat-conductively connected to a cooling source 53 for exhibiting a cooling function through a heat transfer member 54. The heat transfer member 54 is formed of a highly heat-conductive material such as aluminum, aluminum alloys, copper, and copper alloys. Also in the present embodiment, when the driving source 33 is driven, the driving shaft 30 rotates along the direction of the arrow A1 (see FIG. 7) in a height direction (the HA direction) together with the arm portions 31 and the containers 40. When the driving shaft 30 rotates about its axis, the containers 40 are immersed in the viscous substance 9 reserved in the bottom portion 10 of the treatment chamber 16 and scoop the liquid phase viscous substance 9 and then rise above the liquid level 90 of the viscous substance 90 reserved in the bottom portion 10 of the treatment chamber 16 into the space of the treatment chamber 16. When the driving shaft 30 thus rotates about its axis, the viscous substance 9 in the containers 40 is dropped onto the coating surfaces 21 of the coolers 2. As a result, the viscous substance 9 attached onto the coating surfaces 21 of the coolers 2 can be spread on the coating surfaces 21 of the coolers 2 by the coating portions 32 of the coating element 3 and increased in area, while being allowed to flow down by gravity. Even if the viscous substance 9 has a high viscosity, since the viscous substance 9 is increased in area on the coating surfaces 21 of the coolers 2, contact area of the viscous substance 9 and the diluent dramatically increases in the treatment chamber 16. Therefore, the viscous substance 9 is efficiently diluted with the diluent in the treatment chamber 16 so as to have a lower concentration. It should be noted that the present embodiment can be applied, for example, to an absorber of an absorption heat pump device. In this case, the viscous substance 9 is lithium bromide, lithium iodide, or the like, and the diluent is water vapor.

Sixth Embodiment

Figure 8:
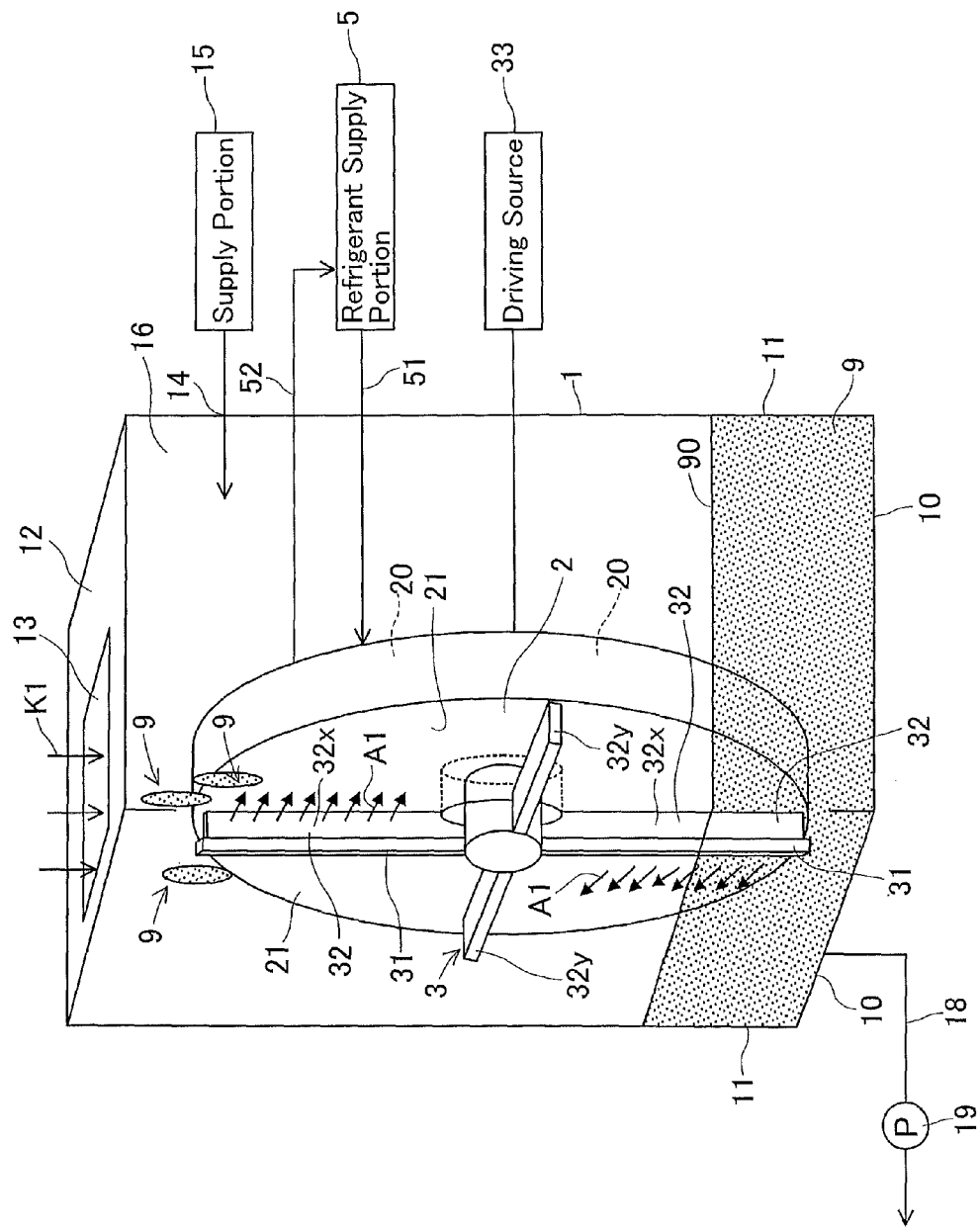
FIG. 8 is a perspective view showing a concept of a device for diluting a viscous substance according to sixth embodiment.

FIG. 8 shows sixth embodiment. The present embodiment has basically the same construction, operation and advantages as those of the respective embodiments. According to the present embodiment, as shown in FIG. 8, coating portions 32 are constituted by plural kinds of coating materials in order to improve coating characteristics, and have relatively soft coating portions 32x having a brush or mop shape, and hard coating portions 32y having the shape of a blade with a high scraping ability. The coating portions 32x are softer than the coating portions 32y. Since the coating portions 32x, 32y are formed of different materials and have different coating characteristics or scraping characteristics, this is advantageous in spreading the viscous substance 9 lying on the coating surface 21 in a film shape. The coating portions 32x, 32y are disposed alternately in the rotational direction of the coating portions 32x, 32y (the direction of the arrow A1). This can contribute to a reduction in uneven coating on the coating surface 21.

The viscous substance 9 is dropped from above the cooler 2 and the coating element 3 toward the cooler 2 and the coating element 3 and thereby supplied to the treatment chamber 16. No container 40 for scooping is provided on the arm portions 31. Also in the present embodiment, when the driving source 33 is driven, the driving shaft 30 rotates along the direction of the arrow A1 (see FIG. 8) in a height direction (the HA direction) together with the arm portions 31. When the driving shaft 30 rotates about its axis, the viscous substance 9 placed on the coating surface 21 of the cooler 2 can be spread on the coating surface 21 of the cooler 2 by the coating portions 32 of the coating element 3 and increased in area. Therefore, contact area of the viscous substance 9 and the diluent dramatically increases in the treatment chamber 16. Therefore, the viscous substance 9 is efficiently diluted with the diluent in the treatment chamber 16 so as to have a lower concentration. In FIG. 8, the number of coolers 2 is single, but the number is not limited to this, and a plurality of coolers 2 can be disposed in parallel with each other. It should be noted that the present embodiment can be applied, for example, to an absorber of an absorption heat pump device. In this case, the viscous substance 9 is lithium bromide, lithium iodide, or the like, and the diluent is water vapor.

Seventh Embodiment

Figure 9:
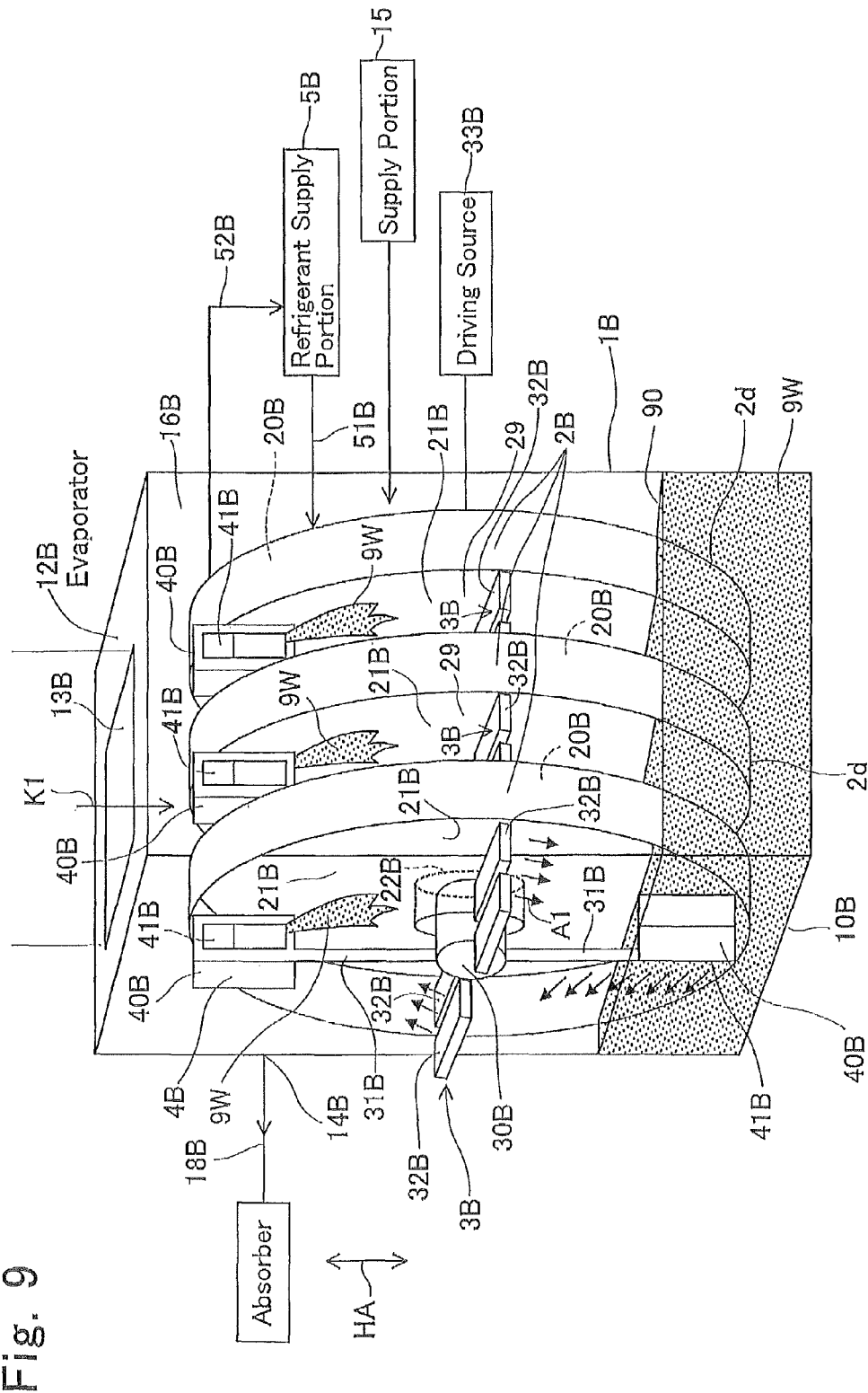
FIG. 9 is a perspective view showing a concept of an evaporator according to seventh embodiment.

FIG. 9 shows seventh embodiment in which the present invention is applied to an absorption heat pump device (an absorption refrigerator). The present embodiment has basically the same construction, operation and advantages as those of the respective embodiments. The absorption heat pump device (the absorption refrigerator) of the present embodiment has a condenser, an evaporator, an absorber, and a regenerator. The absorber has a construction shown in FIG. 1 to FIG. 7. FIG. 9 shows the evaporator for evaporating liquid phase water. This evaporator has basically the same construction as the construction shown in FIG. 1 to FIG. 3. For better distinguishability, reference character B is assigned to respective constitutional elements. As shown in FIG. 9, liquid phase water 9W is reserved in a bottom portion 10B of a treatment chamber 16B. The treatment chamber 16B can have a reduced-pressure atmosphere, a vacuum atmosphere, or an air atmosphere in accordance with application purposes of the present device. In order to promote evaporation of water 9W, it is preferred that the treatment chamber 16B has a reduced-pressure atmosphere or a vacuum atmosphere.

As shown in FIG. 9, the evaporator has a base body 1B, coolers 2B serving as surface elements, and scooping elements 4B. The base body 1B has the shape of a box having the treatment chamber 16B, and has the bottom portion 10B for reserving the liquid phase water 9W which can also serve as a viscous substance having a certain viscosity, a first opening 13B formed at a ceiling portion 12B so as to serve as a viscous substance supply portion for supplying the water 9W to the treatment chamber 16B, and a second opening 14B which communicates with the absorber which carries out a next step. Each of the coolers 2B has the shape of a drum having a horizontally extending axial hole 22B at a center region thereof. A cooling chamber 20B to be supplied with a refrigerant is formed inside of each of the coolers 2B. The plurality of coolers 2B are disposed in parallel with each other in the treatment chamber 16B and heat exchange capability (cooling capability) are secured. Lower portions 2d of the coolers 2B are immersed in the liquid phase water 9W reserved in the bottom portion 10B of the base body 1B, and contact the water 9W. Therefore, when a refrigerant is supplied to the coolers 23, the refrigerant can be expected to exhibit a function of cooling the water 9W reserved in the bottom portion 10B of the base body 1B.

Furthermore, the evaporator comprises a coating element 3B for forcibly spreading water lying on the coating surfaces 21B of the coolers 2B. The coating element 3B has a driving shaft 30B rotatable about its axis, a plurality of arm portions 31B which are connected to the driving shaft 30B and serve as movable members extending in outward radial directions of the driving shaft 30B (radiation directions), and coating portions 32B provided on the arm portions 31B. The driving shaft 30B is disposed so as to be inserted through the axial holes 22B of the coolers 2B, is of a horizontal type having a horizontally extending axis, and connected to a driving source 33B such as a motor. The coating portions 32B can have, for example, a brush shape, a mop shape or a blade shape. The driving shaft 30B is connected to the driving source 33B such as an electric motor provided outside of the base body 1B. When the driving source 33B is driven, the driving shaft 30B rotates about its axis and the coating portions 32B make rotational movements along the coating surfaces 21B of the coolers 2B around the driving shaft 30B. This allows the liquid phase water lying on the coating surfaces 21B of the coolers 2B to be spread on the coating surfaces 21B of the coolers 2B and increased in area. Since the liquid phase water is thus increased in area on the coating surfaces 21B of the coolers 23, evaporation area for evaporating the liquid phase water 9W can be increased. As a result, the coating portions 32B can more forcibly spread the liquid phase water 9W lying on the coating surfaces 21B of the coolers 2B in a film shape and increase area of the liquid phase water 9W.

As shown in FIG. 9, each scooping element 4B has a container 40B for scooping the liquid phase water 9W reserved in the bottom portion 10B of the treatment chamber 16B and dropping the scooped liquid phase water 9W onto the coating surfaces 21B of the coolers 2B. The container 40B is held at a fore end of an arm portion 31B of a coating element 313, has a dipper shape or a cup shape, and has a scoop opening 418. When the driving source 33B is driven, the driving shaft 30B rotates along the direction of the arrow A1 in a height direction (the HA direction) together with the arm portions 31B and the containers 40B. It is preferred that bearings are provided between an outer wall surface of the driving shaft 30B and inner wall surfaces of the axial holes 22B in order to make rotation of the driving shaft 30 smooth. When the driving shaft 30B rotates about its axis, the containers 40B are immersed in the water 9W reserved in the bottom portion 10B of the treatment chamber 16B, scoop the water 9W, and rise above a liquid level 90 of the liquid phase water reserved in the bottom portion 10B of the treatment chamber 16B into space in the treatment chamber 16B. When the driving shaft 30B thus rotates, the liquid phase water 9W in the containers 40B are dropped onto the coating surfaces 21B of the coolers 2B. As a result, the water 9W attached onto the coating surfaces 21B of the coolers 2B can be spread onto the coating surfaces 21B of the coolers 2B by the coating portions 32B of the coating elements 3B and increased in area, while being allowed to flow down by gravity. Since the water 9W is thus increased in area on the coating surfaces 21B of the coolers 2B, evaporation area where the liquid phase water 9W evaporates dramatically increases in the treatment chamber 16B. Therefore, the water 9W can efficiently evaporate in the treatment chamber 16B.

According to the present embodiment, each one of the coolers 2B has a cooling chamber 20B for cooling the cooler 23. The refrigerant is supplied from a refrigerant supply portion 5B through a supply passage 51B to the cooling chamber 203, and the refrigerant in the cooling chamber 20B is returned through an exhaust passage 52B to the refrigerant supply portion 5B. The refrigerant returned to the refrigerant supply portion 5B is cooled by the refrigerant supply portion 513, and then the refrigerant is supplied from the refrigerant supply portion 5B through the supply passage 51B to the cooling chamber 2013. The cooler 2B is thus cooled and the water 9W lying on the coating surface 21B of the cooler 2B can be decreased in temperature. The refrigerant can be anything as long as it has a cooling function and examples include a cooling liquid such as cooling water, a cooling gas, and a mist. It should be noted that a connecting passage 18B which connects the treatment chamber 16B and the absorber in a next step is provided at an upper portion of the treatment chamber 16B. It is preferred that a pump (a delivery source) is provided in the connecting passage 18B. The pump is driven, when needed, to transfer water vapor in the treatment chamber 16B to the absorber through the connecting passage 18B. It is possible to omit the pump and transfer water vapor in the treatment chamber 16B to the absorber through the connecting passage 18B by a difference in pressure.

Also in the evaporator of the present embodiment, the coating portions 32B can contact the coating surfaces 21B of the coolers 2B. In this case, although friction occurs between the coating portions 32B and the coating surfaces 21B of the coolers 2B, water 9W which is a viscous substance lying on the coating surfaces 21B of the coolers 2B can be efficiently spread in a film shape. Alternatively, the coating portions 32B can be located in the vicinity of the coating surfaces 21B of the coolers 2B with micro gaps therebetween and do not contact the coating surfaces 21B of the coolers 2B. In this case, since the friction between the coating portions 32B and the coating surfaces 21B of the coolers 2B is avoided, damage of the coating surfaces 21B of the coolers 2B and/or the coating portions 32B caused by friction can be suppressed. Furthermore, a decrease in friction allows smooth rotation of the coating element 3B and the containers 40B and a decrease in output driving force of the driving source 33B.

Eighth Embodiment

Figure 10:
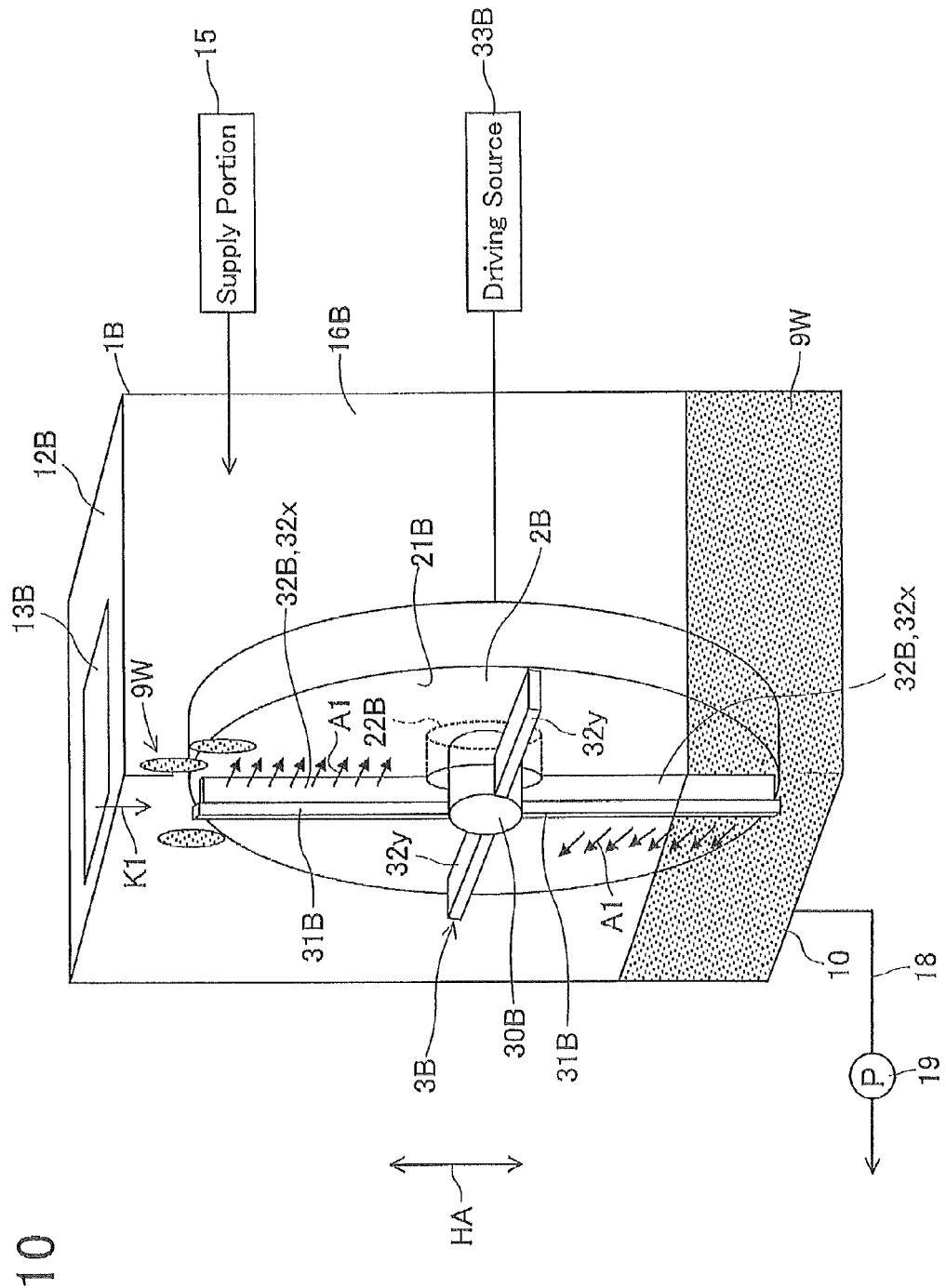
FIG. 10 is a perspective view showing a concept of an evaporator according to eighth embodiment.

FIG. 10 shows eighth embodiment in which the present invention is applied to an absorption heat pump device (an absorption refrigerator). The absorption heat pump device (the absorption refrigerator) of the present embodiment has a condenser, an evaporator, an absorber and a regenerator. The absorber has a construction shown in FIG. 1 to FIG. 7. FIG. 10 shows the evaporator. As can be understood from FIG. 10, liquid phase water 9W as a viscous substance is dropped by gravity from above a cooler 2B and a coating element 3B through a first opening 13B (a viscous substance supply port) formed at a ceiling portion 12B of a base body 1B toward the cooler 2B and the coating element 3B. Arm portions 31B are not provided with containers for scooping. Also in the present embodiment, when a driving source 33B (e.g., a motor or an engine) is driven, a driving shaft 30B rotates along the direction of the arrow A1 in a height direction (the HA direction) together with the arm portions 31B. When the driving shaft 30B rotates about its axis, the water 9W placed on a coating surface 21B of the cooler 2B is spread on the flat coating surface 21B of the cooler 2B by coating portions 32B of the coating element 3B and increased in area, while being allowed to flow down by gravity. Therefore, evaporation area where the liquid phase water 9W evaporates dramatically increases in the treatment chamber 16B. Therefore, the liquid phase water 9W is efficiently evaporated in the treatment chamber 16B. As shown in FIG. 10, the coating portions 32B are formed of plural kinds of materials: brush-shaped coating portions 32x and blade-shaped coating portions 32y. Coating performance is improved and uneven coating can be suppressed.

Ninth Embodiment

Figure 11:
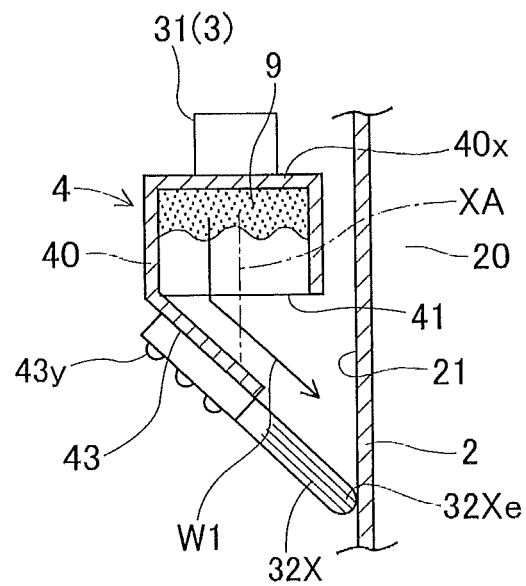
FIG. 11 is a schematic view showing that a viscous substance is dropped onto a coating surface of a cooler by a guide portion formed on a container according to ninth embodiment.

FIG. 11 shows ninth embodiment. Since the present embodiment has the same construction, operation and advantages as those of the embodiment shown in FIG. 4, description will be omitted. As shown in FIG. 11, however, a coating portion 32X is fixed on a guide portion 43 by an attachment 43y. A fore end portion 32Xe of the coating portion 32X contacts a coating surface 21 of a cooler 2, but can be located in the vicinity of the coating surface 21 with a micro gap therebetween. The viscous substance 9 is scooped by the container 40 and coated on the coating surface 21 of the cooler 2 by way of the guide portion 43 and the coating portion 32X. Since the coating portion 32X is provided at the guide portion 43 as shown in FIG. 11, the viscous substance 9 discharged from the container 40 is guided in the direction of the arrow W1 along the guide portion 43 to the coating portion 32X. That is to say, the viscous substance 9 in the container 40 can be reliably transferred to the coating portion 32X by way of the guide portion 43. This suppresses a defect in which the viscous substance 9 in the container 40 drops down without transferred to the coating portion 32X. In other words, when compared to a case where a coating portion is provided at a distance from the guide portion 43, the viscous substance 9 in the container 40 can be effectively transferred from the guide portion 43 to the coating portion 32X and coated on the coating surface 21 of the cooler 2. The coating portion 32X can have a brush shape, a mop shape or a blade shape, and can be either soft or hard.

Tenth Embodiment

Figure 12:
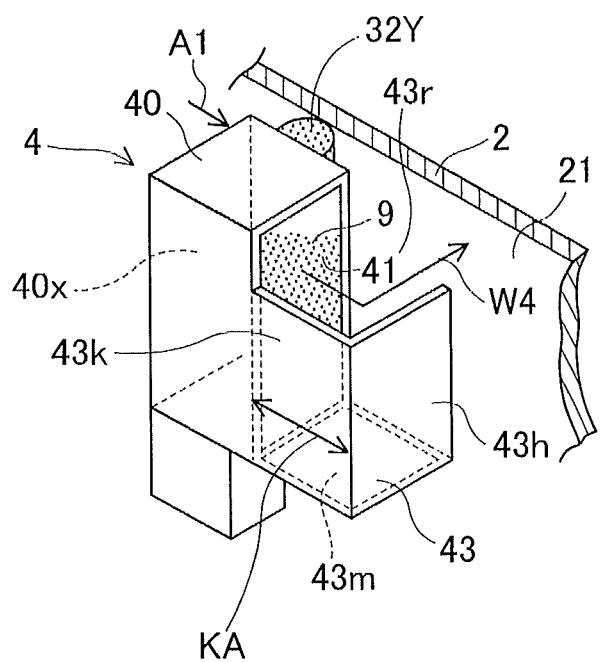
FIG. 12 is a schematic view showing that a viscous substance discharged from a container is coated on a coating surface of a cooler by a coating portion of a container while dropped onto the coating surface according to tenth embodiment.

FIG. 12 shows tenth embodiment. Since the present embodiment has basically the same construction, operation and advantages as those of the embodiment shown in FIG. 6, description will be omitted. As shown in FIG. 12, a coating portion 32Y is provided on a container 40 which rotates in the direction of the arrow A1. Specifically speaking, the coating portion 32Y is provided on one side of the container 40 which faces a coating surface 21 of a cooler 2. In this case, a viscous substance 9 discharged from the container 40 is transferred from the guide portion 43 in the direction of the arrow W4 and gets attached to the coating surface 21 of the cooler 2. This can provide an advantage that the viscous substance 9 immediately after discharged from the container 40 can be efficiently coated on the coating surface 21 by the coating portion 32Y provided on the container 40. The coating portion 32Y can have a brush shape, a mop shape or a blade shape, and can be either soft or hard.

Application Embodiment

Figure 13:
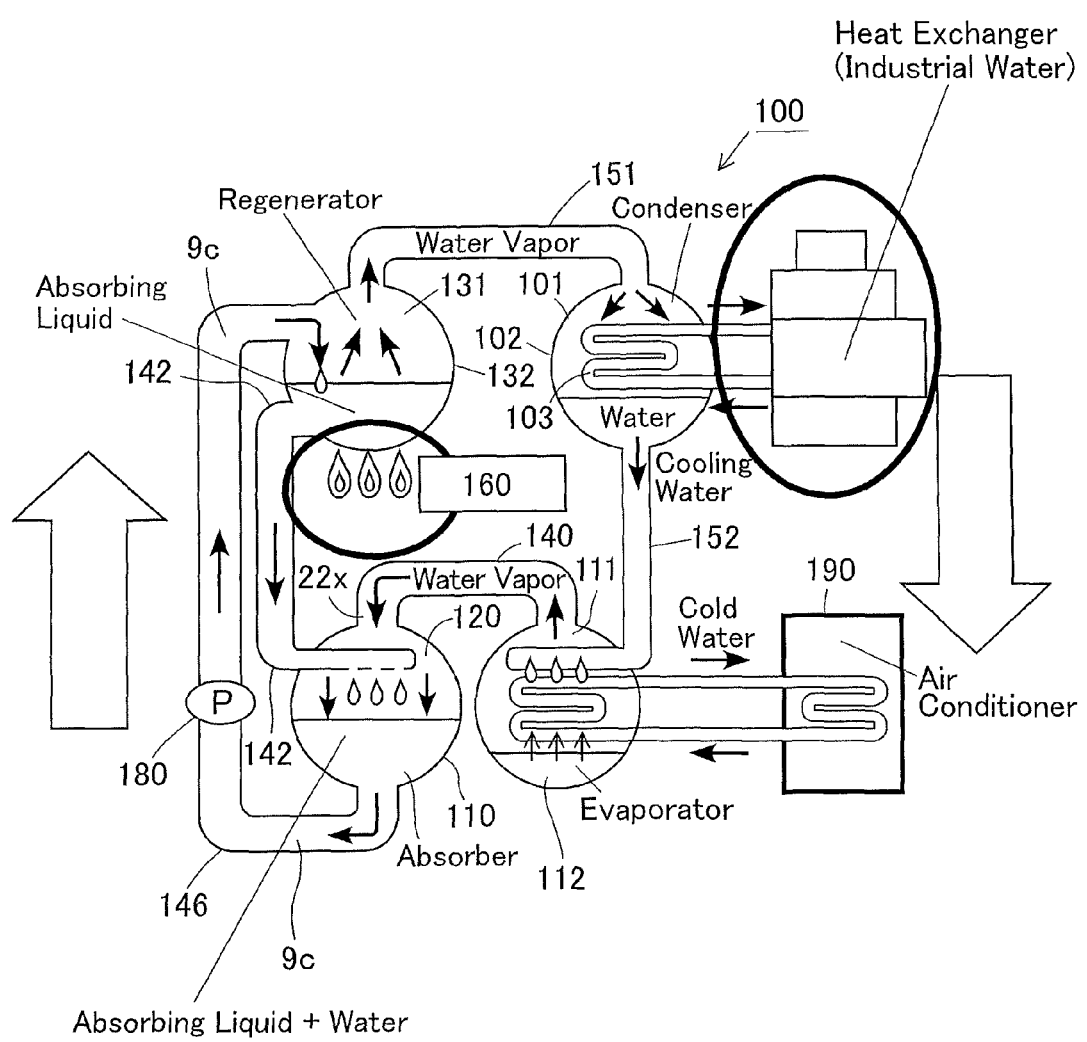
FIG. 13 is a view showing a concept of an absorption heat pump device according to an application embodiment.

FIG. 13 shows an application embodiment. Basically, the abovementioned respective embodiments can be applied to this application embodiment. FIG. 13 shows a concept of an absorption heat pump device. Therefore, a viscous substance is an absorbing liquid. Examples of the absorbing liquid include a compound of a halogen element and lithium, such as lithium bromide and lithium iodide. A diluent is vapor phase water, that is, water vapor. Since the absorbing liquid has a high viscosity and a low flowability before diluted with the diluent, it is effective in increasing area of the absorbing liquid to forcibly coat the absorbing liquid in a film shape by the abovementioned coating element 3.

An absorption heat pump device (an absorption refrigerator) 100 comprises a condenser 102 having a condensation chamber 101 for condensing water vapor (a gas phase diluent) supplied from a regenerator 132 to form liquid phase condensed water (a liquid phase diluent); an evaporator 112 having an evaporation chamber 111 which is maintained at a high vacuum state for evaporating liquid phase condensed water (the liquid phase diluent) to form water vapor (a gas phase diluent); an absorber 110 having a treatment chamber 120 for forming a dilute absorbing liquid (a dilute viscous substance) by causing an absorbing liquid (a viscous substance having a high viscosity) to absorb water vapor (a diluent); and a regenerator 132 having a regeneration chamber 131 for separating water vapor (the diluent) and an absorbing liquid (the viscous substance having a high viscosity) from the dilute absorbing liquid (the dilute viscous substance) supplied from the absorber 110. Furthermore, an absorbing liquid supply passage 142 is provided for connecting the regeneration chamber 131 of the regenerator 132 and the treatment chamber 120 of the absorber 110. The absorbing liquid supply passage 142 allows the absorbing liquid (the viscous substance) to be supplied from the regenerator 132 to the treatment chamber 120 of the absorber 110. A water vapor supply passage 140 is provided for connecting the evaporation chamber 111 of the evaporator 112 and the treatment chamber 120 of the absorber 110. The water vapor supply passage 140 allows water vapor (the diluent) to be supplied from the evaporator 112 to the absorber 110.

As shown in FIG. 13, the condenser 102 has a cooling pipe 103 for flowing a refrigerant. The condenser 102 condenses water vapor supplied from the regeneration chamber 132 through a passage 151 by cooling the water vapor by the cooling pipe 103 to form liquid phase water and obtain condensation latent heat. Liquid phase water which is condensed water formed at the condenser 102 is transferred to the evaporator 112 through a passage 152. At the evaporator 112, liquid phase water drops down from holes of the passage 152 into the evaporation chamber 111. The dropped liquid phase water becomes water vapor (a gas phase diluent) in the evaporation chamber 111 in a high vacuum state. The evaporator 112 thus evaporates liquid phase water which is condensed water formed at the condenser 101 to form water vapor (a diluent) and obtain evaporation latent heat (an endothermic action). The evaporation latent heat is used as a cooling function of an air conditioner 190. The water vapor (the diluent) evaporated at the evaporator 112 is supplied through the water vapor supply passage 140 and a water vapor supply port 22x to the treatment chamber 120 of the absorber 110.

At the absorber 110, a highly concentrated absorbing liquid as a viscous substance drops down from the absorbing liquid supply passage 142 by gravity. The dropped highly concentrated absorbing liquid absorbs water vapor (the diluent) in the treatment chamber 120. As a result, the highly concentrated absorbing liquid is diluted in the treatment chamber 120 of the absorber 110 to become a dilute absorbing liquid 9c. The dilute absorbing liquid 9c formed in the treatment chamber 120 of the absorber 110 is transferred to the regeneration chamber 131 of the regenerator 132 by a pump 180 (a delivery source) in a passage 146. The dilute absorbing liquid 9c transferred to the regeneration chamber 131 is heated by a heating portion 160 such as a combustion burner and an electric heater, thereby forming water vapor. The formed water vapor is supplied through a passage 151 to the condenser 102. The dilute absorbing liquid 9c is thus condensed in the regeneration chamber 131 to become a highly concentrated absorbing liquid. The regenerated highly concentrated absorbing liquid (a viscous substance) is returned from the regeneration chamber 131 through the absorption liquid supply passage 142 to the absorber 110.

As mentioned before, the absorbing liquid as a viscous substance is exemplified by lithium bromide and lithium iodide. At the condenser 102 in the absorption heat pump device, condensation heat is thus obtained and a heating action is obtained. On the other hand, at the evaporator 112, an endothermic action is obtained by evaporation latent heat and a cooling action is obtained. In the present embodiment, the absorber 110 of the absorption heat pump device (the absorption refrigerator) can be constituted by the devices shown in FIG. 1 to FIG. 12 mentioned above. The evaporator 112 can also be constituted by the devices shown in FIG. 1 to FIG. 12 mentioned above.

Others

The present invention is not limited to the embodiments described above and shown in the drawings, and suitable modifications may be made thereto without departing the gist of the present invention. According to first embodiment shown in FIG. 1, the containers 40 and the coating portions 32 are provided alternately on the plurality of arm portions 31, but the present invention is not limited to this and both a container 40 and a coating portion 32 can be provided on each of the arm portions 31. The coolers 2 have a cylindrical drum shape, but the present invention is not limited to this and can be a fan-like drum shape. Each of the surface elements is constituted by a cooler 2 having a cooling chamber 20, but each of the surface elements is not limited to this and can have the shape of a plate having a large area on which a viscous substance can be spread. The surface elements can have no cooling function. It should be noted that the following technical ideas can be grasped from the description of the present invention.

Appendix 1

An evaporator comprising: a base body having a treatment chamber for evaporating liquid phase water; a surface element disposed in the treatment chamber of the base body and having a coating surface to be attached by the liquid phase water supplied to the treatment chamber of the base body; and a coating element having a movable member disposed in the treatment chamber of the base body and being movable along the coating surface of the surface element, and a coating portion disposed on the movable member and mechanically spreading liquid phase water attached to the coating surface of the surface element on the coating surface of the surface element in association with movement of the movable member to increase its area and promote evaporation. In this case, evaporation can be promoted by mechanically spreading the liquid phase water on the coating surface of the surface element in association with movement of the movable member to increase its area. In order to promote evaporation, it is preferred that the treatment chamber is in a reduced pressure state or a vacuum state.

Appendix 2

The evaporator according to Appendix 1, wherein a scooping element for scooping the liquid phase water reserved in a bottom portion of the treatment chamber and dropping the scooped liquid phase water onto the coating surface of the surface element is disposed in the treatment chamber of the base body.

Appendix 3

The evaporator according to Appendix 1 or 2, wherein the scooping element comprises one or more containers which are capable of being immersed in the liquid phase water reserved in a bottom portion of the treatment chamber and capable of rising above the liquid phase water reserved in the bottom portion of the treatment chamber, so that the liquid phase water reserved in the bottom portion of the treatment chamber is scooped by the immersion and rise of the one or more containers and dropped onto the coating surface of the surface element.

Appendix 4

The evaporator according to Appendix 3, wherein the container is held by the movable member.

Appendix 5

The evaporator according to one of Appendix 1 to Appendix 4, wherein the surface element can be cooled.

The invention claimed is:
1. A device for diluting a viscous substance, comprising:
   (i) a base body having a treatment chamber to be supplied with a viscous substance and a diluent for diluting the viscous substance;
   (ii) a surface element disposed in the treatment chamber of the base body and having a coating surface to be attached by the viscous substance supplied to the treatment chamber of the base body;
   (iii) a coating element having a movable member disposed in the treatment chamber of the base body and being movable along the coating surface of the surface element, and a coating portion disposed on the movable member and mechanically spreading the viscous substance attached to the coating surface of the surface element on the coating surface of the surface element in association with movement of the movable member to increase area of the viscous substance; and
   (iv) a scooping element disposed in the treatment chamber of the base body and scooping the viscous substance reserved in a bottom portion of the treatment chamber and dropping the scooped viscous substance onto the coating surface of the surface element.

2. The device for diluting a viscous substance according to claim 1, wherein the scooping element comprises one or more containers which are capable of being immersed in the viscous substance reserved in the bottom portion of the treatment chamber and capable of rising above the viscous substance reserved in the bottom portion of the treatment chamber, so that the viscous substance reserved in the bottom portion of the treatment chamber is scooped by the immersion and rise of the one or more containers and dropped onto the coating surface of the surface element.

3. The device for diluting a viscous substance according to claim 2, wherein the container has a guide portion for enhancing attachability of the viscous substance to the coating surface by guiding the viscous substance scooped in the container toward the coating surface of the surface element.

4. The device for diluting a viscous substance according to claim 3, wherein at least one of the guide portion and the container comprises the coating portion.

5. The device for diluting a viscous substance according to claim 2, wherein the container of the scooping element is held by the movable member of the coating element in a manner to move in association with the coating portion of the coating element, and the scooping element and the coating element are driven by a common driving source.

6. The device for diluting a viscous substance according to claim 1, wherein the surface element can be cooled.

7. The device for diluting a viscous substance according to claim 1, wherein the base body is a base body of an absorber or a base body of an evaporator of an absorption heat pump device.

* * * * *